US 10,958,184 B2

(12) United States Patent
Giuntini et al.

(10) Patent No.: US 10,958,184 B2
(45) Date of Patent: Mar. 23, 2021

(54) UNINTERRUPTIBLE POWER SUPPLY AND METHOD OF OPERATION

(71) Applicant: ABB Schweiz AG, Baden (CH)

(72) Inventors: Lorenzo Giuntini, Locarno (CH); Silvio Colombi, Riazzino (CH); Andrea Mannuccini, Locarno (CH)

(73) Assignee: ABB Schweiz AG, Baden (CH)

( * ) Notice: Subject to any disclaimer, the term of this patent is extended or adjusted under 35 U.S.C. 154(b) by 833 days.

(21) Appl. No.: 14/327,171

(22) Filed: Jul. 9, 2014

(65) Prior Publication Data

US 2016/0013728 A1  Jan. 14, 2016

(51) Int. Cl.
*H02M 5/458* (2006.01)
*H02J 9/06* (2006.01)
*H02M 7/487* (2007.01)

(52) U.S. Cl.
CPC ............ *H02M 5/458* (2013.01); *H02J 9/062* (2013.01); *H02J 9/063* (2020.01); *H02M 7/487* (2013.01)

(58) Field of Classification Search
CPC .... H02J 9/062; H02J 2009/063; H02M 5/458; H02M 7/487
USPC ......................................................... 307/66
See application file for complete search history.

(56) References Cited

U.S. PATENT DOCUMENTS

| | | | |
|---|---|---|---|
| 5,343,079 A | 8/1994 | Mohan et al. | |
| 6,404,655 B1 | 6/2002 | Welches | |
| 6,879,053 B1 | 4/2005 | Welches et al. | |
| 6,924,993 B2 | 8/2005 | Stancu et al. | |
| 6,950,321 B2 | 9/2005 | Stancu et al. | |
| 7,505,292 B2 | 3/2009 | Delarue et al. | |
| 8,093,746 B2 | 1/2012 | Murali Dora et al. | |
| 8,294,306 B2 | 10/2012 | Kumar et al. | |
| 8,587,975 B2 | 11/2013 | Jain et al. | |

(Continued)

FOREIGN PATENT DOCUMENTS

| | | |
|---|---|---|
| CN | 1764054 A | 4/2006 |
| CN | 101001051 A | 7/2007 |
| EP | 2693627 A2 | 2/2014 |

OTHER PUBLICATIONS

Zhang et al., "Four-legged three-phase PFC rectifier with fault tolerant capability", Power Electronics Specialists Conference, Jun. 2000; pp. 359-364, vol. 1, IEEE.

(Continued)

*Primary Examiner* — Rexford N Barnie
*Assistant Examiner* — Swarna N Chowdhuri
(74) *Attorney, Agent, or Firm* — Barnes & Thornburg LLP (57) ABSTRACT

An uninterruptible power supply (UPS) is provided that includes a split direct current (DC) link having a first capacitor coupled between a positive DC link terminal and a first node, and a second capacitor coupled between the first node and a negative DC link terminal. The UPS also includes a rectifier coupled to an input of the split DC link and a controller coupled to the rectifier. The rectifier includes first, second, and third legs, wherein each leg is configured to convert a first alternating current (AC) voltage received from an AC source into a DC voltage to be provided to the split DC link, and a fourth leg configured to balance DC link voltages of the first and second capacitors. The controller is configured to maintain functionality of the rectifier during at least one of a partial utility power outage, a full utility outage, and a failure of at least one of the first, second, third, and fourth legs.

20 Claims, 6 Drawing Sheets

(56) References Cited

U.S. PATENT DOCUMENTS

| | | | | |
|---|---|---|---|---|
| 2006/0077701 | A1* | 4/2006 | Baudesson | H02M 5/4585 363/132 |
| 2007/0228837 | A1 | 10/2007 | Nielsen et al. | |
| 2010/0229580 | A1* | 9/2010 | Schnetzka | H02M 5/458 62/228.4 |
| 2013/0258725 | A1* | 10/2013 | Colombi | H02M 7/219 363/37 |
| 2014/0036555 | A1* | 2/2014 | Kolhatkar | H02M 7/487 363/56.01 |

OTHER PUBLICATIONS

Lei et al., "A Dual Loop Control Strategy for Parallel Interleaved Three-Phase Four-Leg PWM Boost-Type Rectifier in UPS", Przeglad Elektrotech Niczny (Electrical Review), 2012, pp. 242-246.

Gannett et al., "Application of Synchronous and Stationary Frame Controllers for Unbalanced and Non-Linear Load Compensation in 4-Leg Inverters", Applied Power Electronics Conference and Exposition, Mar. 2002, pp. 1038-143, vol. 2, Virginia Polytechnic Institute, Blacksburg, VA.

Bellini et al., "A simple control technique for three-phase four-leg inverters", Power Electronics, Electrical Drives, Automation and Motion, SPEEDAM, May 2006, pp. 1143-1148.

Chen et al., "A multilevel converter topology with fault-tolerant ability", Power Electronics, IEEE, Mar. 2005, pp. 404-415, vol. 20, Issue 2.

Ceballos et al., "Three-Level Converter Topologies With Switch Breakdown Fault-Tolerance Capability", Industrial Electronics, IEEE, Mar. 2008, pp. 982-995, vol. 55, Issue 3.

Park et al., "High-Performance Transformerless Online UPS" Industrial Electronics, IEEE, Aug. 2008, pp. 2943-2953, vol. 55, Issue 8.

Camargo et al., "New Limiting Algorithms for Space Vector Modulated Three-Phase Four-Leg Voltage Source Inverter", IEEE 33rd Annual Power Electronics Specialists Conference, vol. No. 1, pp. 232-237, 2002.

Shen et al., "Fixed-Frequency Space-Vector-Modulation Control for Three-Phase Four-Leg Active Power Filters", IEE Proceedings of Electric Power Applications, vol. 149, No. 4, pp. 268-274, Jul. 2002.

Welchko et al., "Fault Tolerant Three-Phase AC Motor DriveTopologies: A Comparison of Features,Cost, and Limitations", IEEE Transactions on Power Electronics, vol. 19, No. 4, pp. 1108-1116, Jul. 2004.

Tracy et al., "Achieving High Efficiency in a Double Conversion Transformerless UPS", 31st Annual Conference of IEEE Industrial Electronics Society, Raleigh, NC, pp. 942-945, Nov. 2005.

Bellini et al., "Modulation Techniques for Three-Phase Four-Leg Inverters", Proceedings of the 6th WSEAS International Conference on Power Systems, Lisbon, Portugal, pp. 398-403, Sep. 2006.

Demirkutlu et al., "Output Voltage Control of a Four-Leg Inverter Based Three-Phase UPS by Means of Stationary Frame Resonant Filter Banks", IEEE International Electric Machines & Drives Conference, Antalya-Turkey, vol. 1, pp. 880-885, May 2007.

Ceballos et al., "Efficient Modulation Technique for a Four-Leg Fault-Tolerant Neutral-Point-Clamped Inverter", IEEE Transactions on Industrial Electronics, vol. 55, No. 3, pp. 1067-1074, Mar. 2008.

Kouzou A et al., "The Space Vector Modulation PWM Control Methods Applied on Four Leg Inverters", Electric Machines and Drives, pp. 233-262, Feb. 2011.

Meinguet et al., "Fault Detection, Isolation and Control Reconfiguration of Three-Phase PMSM Drives", IEEE International Symposium on Industrial Electronics, Gdansk, pp. 2091-2096, Jun. 2011.

European Search Report and Written Opinion issued in connection with corresponding EP Application No. 15174632.8 dated Dec. 3, 2015.

First Office Action Issued by China National Intellectual Property Administration, Application No. 201510400658.6, dated Aug. 2, 2018, 13 pages (including translation).

* cited by examiner

UNINTERRUPTIBLE POWER SUPPLY AND METHOD OF OPERATION

BACKGROUND

The field of the invention relates generally to power supplies, and more particularly, to an uninterruptible power supplies (UPS) and methods of operation.

At least some UPS systems, for example, three-phase double conversion UPS systems, typically include a front-end rectifier, a direct current (DC) link with a capacitor and an energy storage device, and an inverter. Such UPS systems use the front-end rectifier to convert source alternating current (AC) power into DC power that may be supplied to the DC link. The DC link then provides the DC power to the capacitor, the energy storage device, and the inverter. The inverter converts the DC power back to AC power, which is then used to power a load. If the AC power input into the front-end rectifier becomes unavailable, the energy storage device acts as a DC battery for the inverter, so the inverter can continue to provide AC power to the load. In this manner, the UPS provides uninterrupted power to loads when its input AC power source becomes unavailable.

Under balanced load conditions, a constant power may be drawn from the input AC power source by the front-end rectifier, thereby providing for balanced three-phase source currents from the input AC power source. As a result, the output of the front-end rectifier is a steady state DC voltage. In at least some known UPS systems, the rectifier is switched OFF whenever the input utility is outside of given tolerances, even for single-phase events and single leg failures. In case the input utility experiences frequent events, the UPS systems would switch off the rectifier frequently. The rectifier ON/OFF cycle causes stress on the converter. Additionally, the inverter draws power from the battery when the rectifier is OFF. Repeated discharge cycles may reduce battery life and/or reduce battery autonomy.

BRIEF DESCRIPTION

In one aspect, an uninterruptible power supply (UPS) is provided that includes a split direct current (DC) link having a first capacitor coupled between a positive DC link terminal and a first node, and a second capacitor coupled between the first node and a negative DC link terminal. The UPS also includes a rectifier coupled to an input of the split DC link and a controller coupled to the rectifier. The rectifier includes first, second, and third legs, wherein each leg is configured to convert a first alternating current (AC) voltage received from an AC source into a DC voltage to be provided to the split DC link, and a fourth leg configured to balance DC link voltages of the first and second capacitors. The controller is configured to maintain functionality of the rectifier during at least one of a partial utility power outage, a full utility outage, and a failure of at least one of the first, second, third, and fourth legs.

In another aspect, a method of operating an uninterruptible power supply (UPS) is provided. The method includes providing a split direct current (DC) link including a first capacitor coupled between a positive DC link terminal and a first node, and a second capacitor coupled between the first node and a negative DC link terminal. The method also includes converting an alternating current (AC) voltage received from an AC source into a DC voltage to be provided to the split DC link, the AC voltage converted using at least one of a first leg, a second leg, and a third leg of a rectifier coupled to an input of the split DC link. The method also includes balancing DC link voltages of the first and second capacitors using a fourth leg of the rectifier. The method further includes maintaining, by a controller coupled to the rectifier, functionality of the rectifier during at least one of a partial utility power outage, a full utility power outage, and a failure of at least one of the first, second, third, and fourth legs.

DETAILED DESCRIPTION

Figure 1:
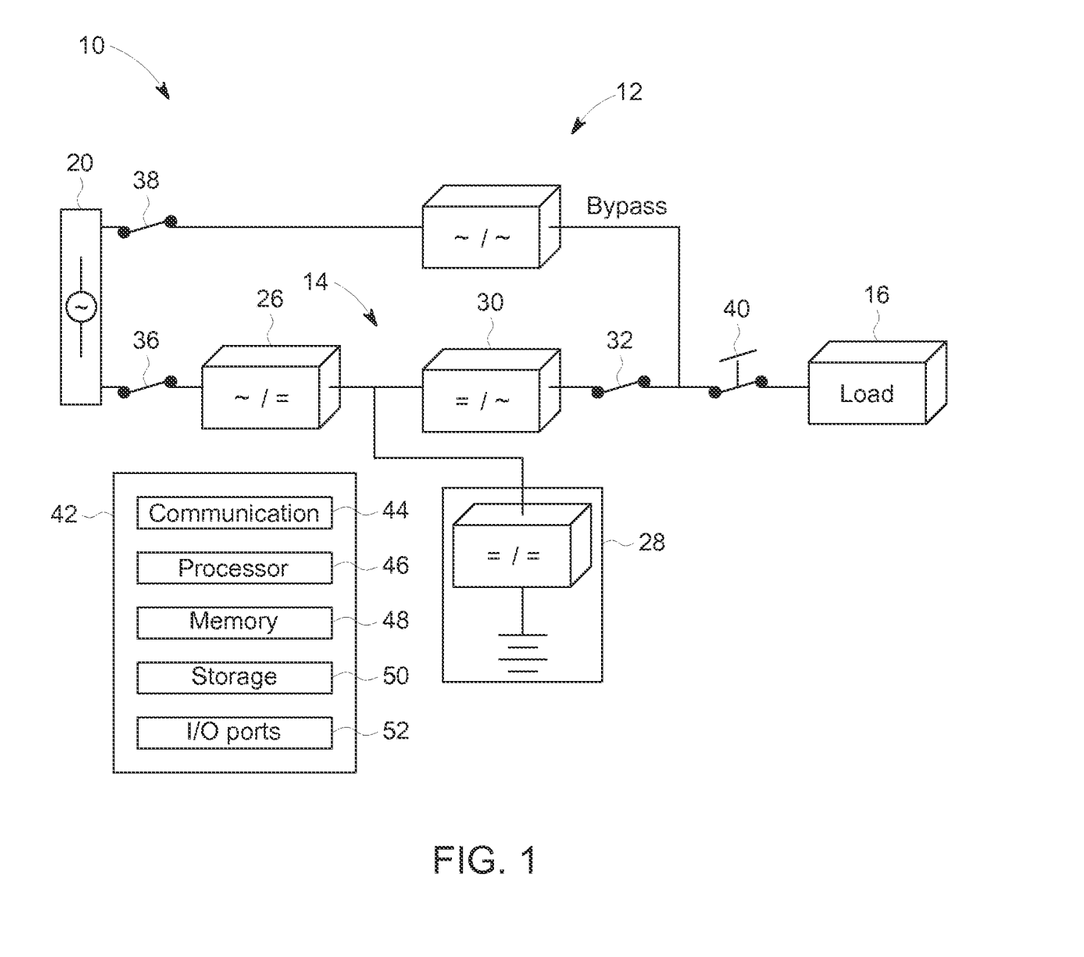
FIG. 1 a block diagram of an exemplary uninterrupted power supply (UPS) system.

FIG. 1 is block diagram of an exemplary uninterruptible power supply (UPS) system 10. In an exemplary embodiment, UPS system 10 includes a bypass feed path 12 coupled in parallel to an inverter feed path 14 such that each path may provide power to a load 16. To provide power to load 16, bypass feed path 12 and inverter feed path 14 are coupled to one or more power sources (not shown). The power source may be a utility power source or some other alternating current (AC) power source.

In an exemplary embodiment, bypass feed path 12 includes a Static Switch Module (not shown) implemented as a pair of anti-parallel thyristors per phase. Inverter feed path 14 includes a rectifier 26, an energy storage device 28, and an inverter 30. Rectifier 26 receives AC voltage from the power source and converts it into DC voltage. Inverter 30 receives the DC voltage from rectifier 26 or energy storage device 28, which may also output a DC voltage, and converts the DC voltage into an AC voltage, which is fed to load 16.

In an exemplary embodiment, during normal operation, UPS system 10 feeds load 16 using inverter feed path 14. UPS system 10 operates in the normal mode by closing switch (K7) 32 such that an inverter current is delivered to load 16 from the power source. Alternatively, UPS system 10 operates in bypass mode by opening switch (K7) 32 and closing the bypass static switch. Bypass path 12 is not ON (closed) at all times.

UPS system 10 may also include disconnect switches (K4) 36, (K6) 38, and (Q1) 40, which may provide additional protection and/or control for UPS system 10. In some embodiments, disconnect switches (K4) 36, (K6) 38, and (Q1) 40 include manual disconnects.

In an exemplary embodiment, energy storage device 28 is configured to bridge UPS system 10 through power interruptions. Energy storage device 28 may be connected directly to the DC link (in transformer-based units) or may be connected through a DC-DC (buck/boost) converter taking care of voltage adaptation. Energy storage device 28 is a battery or any other known form of energy storage connected to the DC link either directly or through a DC-DC conversion stage.

In an exemplary embodiment, UPS system 10 includes a controller 42. Controller 42 includes a communication component 44, a processor 46, a memory 48, storage 50, input/output (I/O) ports 52, and the like. Communication component 44 is a wireless or wired communication component that facilitates communication between various components (e.g., switches, rectifier, inverter) within UPS system 10. Processor 46 is any type of computer processor or microprocessor capable of executing computer-executable code. Memory 48 and storage 50 are any suitable articles of manufacture that can serve as media to store processor-executable code. These articles of manufacture represent computer-readable media (i.e., any suitable form of memory or storage) that may store the processor-executable code used by processor 46 to perform the embodiments described herein.

In some embodiments, controller 42 receives data related to inverter bridge currents, inverter load currents, an output AC voltage signal, bypass load currents, and bypass input voltages from any sensor suitable for the intended purpose. Using the received data, controller 42 analyzes UPS system 10 and determines whether to control rectifier 26 maintain functionality of rectifier 26 during at least one of a partial utility power outage, a full utility outage, and a failure of at least one of the rectifier legs.

During normal operation, controller 42 sends signals to various components (e.g., rectifier 26, inverter 30) within UPS system 10 such that rectifier 26 converts power received from power source 20 to regulated DC power to charge energy storage device 28 as well as supply DC power to inverter 30. Inverter 30 may then convert the DC power to a frequency regulated (i.e., controllable) AC voltage. If at any time power source 20 fails to provide power to rectifier 26, inverter 30 may draw DC power from energy storage device 28 and may continue to supply output power to load 16.

While FIG. 1 depicts UPS system 10 in a one-line diagram form, it should be noted that in certain embodiments, the UPS system 10 may have multiple phases, such as three phases. For example, the output AC power provided to the load 16 may include any number of phases (e.g., u1, u2, u3). As such, any reference made herein to a current or a voltage in one phase is intended to be a reference to the current and voltage of each phase.

Figure 2:
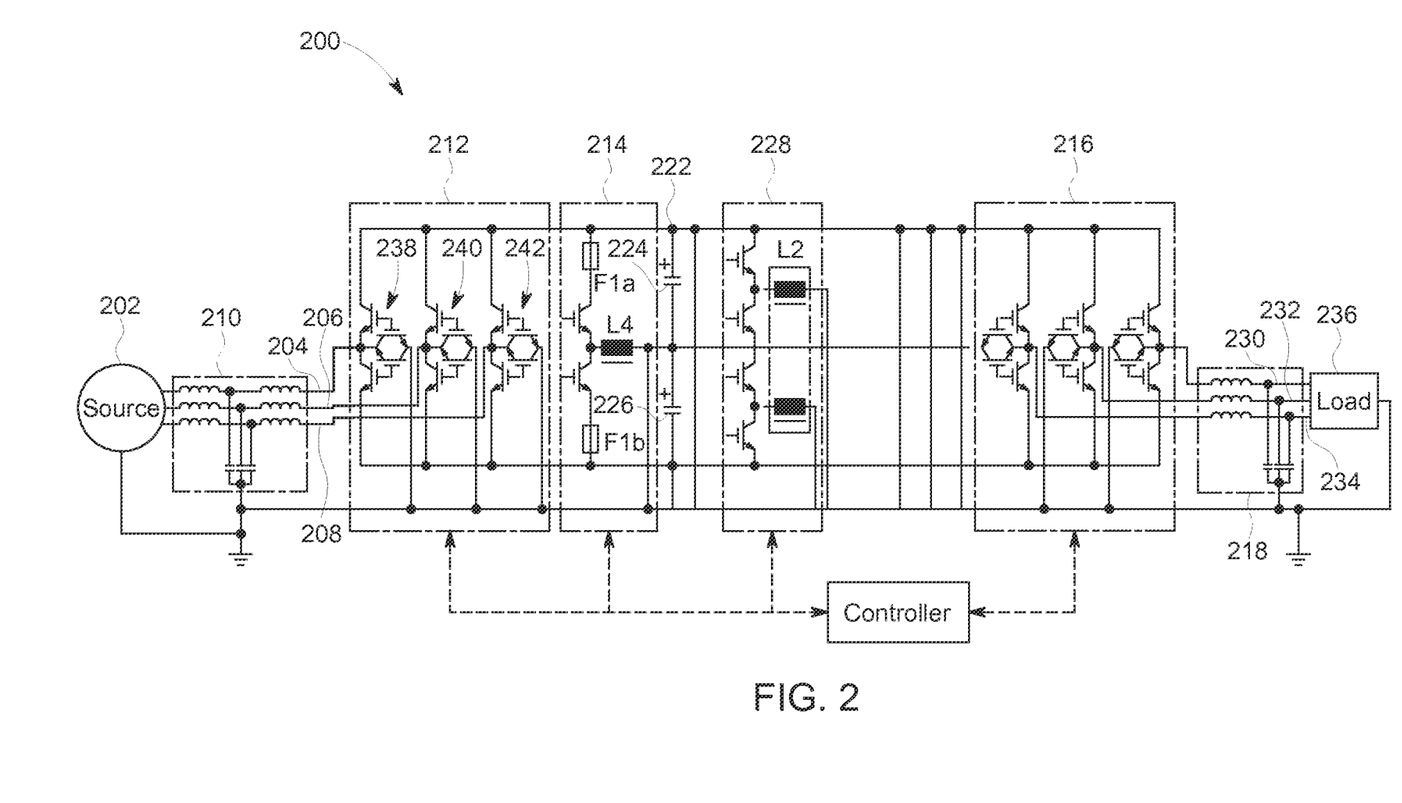
FIG. 2 is a circuit diagram of an exemplary uninterrupted power supply (UPS).

FIG. 2 is a circuit diagram of an exemplary uninterrupted power supply (UPS) 200. In one embodiment, UPS 200 is UPS system 10 (shown in FIG. 1). In an exemplary embodiment, UPS 200 is coupled to an alternating current (AC) input source 202 that supplies three-phase power via lines 204, 206, and 208. AC input source 202 may represent, for example, utility power from an electrical grid or a local or remote generator. UPS 200 includes an input filter 210, a rectifier 212, a fourth leg 214, an inverter 216, an output filter 218, and a controller 220. Controller 220 controls operation of rectifier 212 such that rectifier 212 provides direct current (DC) power to inverter 216. Rectifier 212 converts the three-phase AC power from AC input source 202 into DC power on a DC link 222. In an exemplary embodiment, DC link 222 is a split DC link 222 and includes an upper capacitor 224 and a lower capacitor 226. Upper and lower capacitors 224 and 226 are coupled between positive and negative terminals of DC link 222 and filter residual AC components of the DC power on DC link 222. In addition to upper and lower capacitors 224 and 226, fourth leg 214 stabilizes and balances DC link 222 voltage. An energy storage device 228 is coupled between the positive and negative terminals of DC link 222 for storing DC power. As such, DC power may be provided to inverter 216 via rectifier 212 and fourth leg 214 when AC input source 202 is ON, or via energy storage device 228 when AC input source 202 is OFF. Inverter 216 subsequently converts the DC power on DC link 222 into three-phase AC power on lines 230, 232, and 234. The three-phase AC power is then output to load 236.

In an exemplary embodiment, controller 220 is substantially similar to controller 42 (shown in FIG. 1) and controls operation of rectifier 212 using a processor operably coupled to memory and/or storage. The processor and/or other data processing circuitry may carry out instructions stored on any suitable article of manufacture having one or more tangible, machine-readable media at least collectively storing such instructions. The memory and/or storage may represent such articles of manufacture. Among other things, the memory and/or the storage may represent random-access memory, read-only memory, rewriteable memory, a hard drive, or optical discs. Additionally or alternatively, controller 220 may include a field programmable gate array (FPGA) or an application-specific integrated circuit (ASIC) that has been programmed to carry out the techniques discussed herein or to support the processor (e.g., by assisting in communication).

In an exemplary embodiment, controller 220 controls how rectifier 212 converts the AC power from AC input source 202 into DC power for DC link 222 by sending switching signals to a number of switches, for example, Insulated Gate Bipolar Transistors (IGBT), included within rectifier 212. In this manner, controller 220 controls the amount of current passing through each of a first leg 238, a second leg 240, and a third leg 242 of rectifier 212, which in turn, controls the amount of current drawn from each phase of AC input source 202 on lines 204, 206, and 208.

Under normal operating conditions, fourth leg 214 maintains a balance of DC link 222 voltage. However, in the event of a failure of fourth leg 214, an alternative form of DC link 222 voltage balancing may become necessary. Controller 220 sends switching signals to rectifier 212 at regular intervals such that each leg 238, 240, 242 of rectifier 212 draws an equal amount of current from AC input source 202, thereby providing for balanced three-phase input currents. However, in the event of at least one of a partial utility power outage, a full utility outage, and a failure of at least one of said first, second, third, and fourth legs 238, 240, 242, 214, controller 220 is configured to maintain functionality of rectifier 212.

Figure 3:
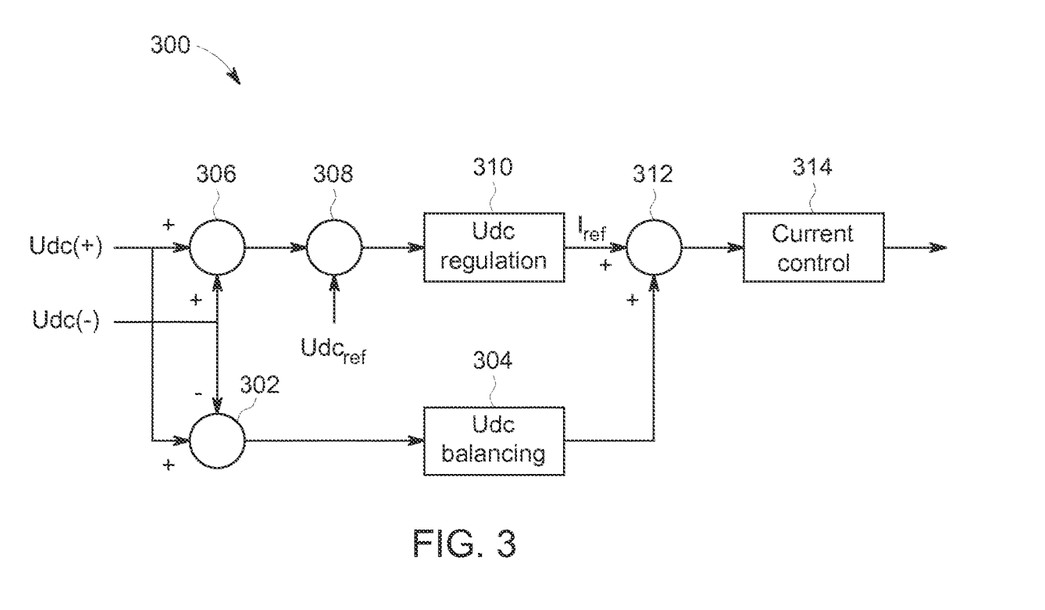
FIG. 3 is a block diagram of an exemplary control algorithm for compensating an unbalance in DC link voltage when a component failure affects the fourth leg shown in FIG. 2 and utility power is present.

FIG. 3 is a block diagram of an exemplary control algorithm 300 for compensating an unbalance in DC link 222 (shown in FIG. 2) when a component failure affects fourth leg 214 (shown in FIG. 2) and utility power is present. In an exemplary embodiment, controller 220 (shown in FIG. 2) implements control algorithm 300 to control operation of rectifier 212 (shown in FIG. 2) to compensate for any unbalance in DC link 222 voltage in case of component failure affecting fourth leg 214 by drawing a DC component from AC input 202. When UPS 200 (shown in FIG. 2) has a split DC capacitor implementation, it is important to maintain a balance of the voltage on the two-capacitor bank. Any unbalance in voltage will result in the presence of a DC component on the AC output voltage. In the exemplary embodiment, UPS 200 is transformerless, so the DC component would be fed to the load. Because the load is connected to an AC system, it cannot be expected to handle a DC component, and such a component may disrupt the load operation causing a loss of function or even damage.

In an exemplary embodiment, controller 220 receives voltage measurements for upper and lower capacitors 224 and 226, and calculates a difference between the voltage measurements at a first summing junction 302. The calculated difference is input into a Udc balancing block 304.

Rectifier 212 also performs its normal regulation of the DC link voltage. The voltage measurements for upper and lower capacitors 224 and 226 are summed at a second summing junction 306 to calculate a measured Udc, which represents the actual DC link voltage. The Udc is subtracted from a reference Udc at a third summing junction 308. The resultant value is applied to a Udc regulation block 310, which generates a rectifier current reference signal Iref. The output of Udc balancing block 304 is then summed with reference current Iref at a fourth summing junction 312 to substantially offset reference current Iref. The result is input to a current control block 314, which controls the draw of the DC component to be pulled from the utility power.

Figure 4:
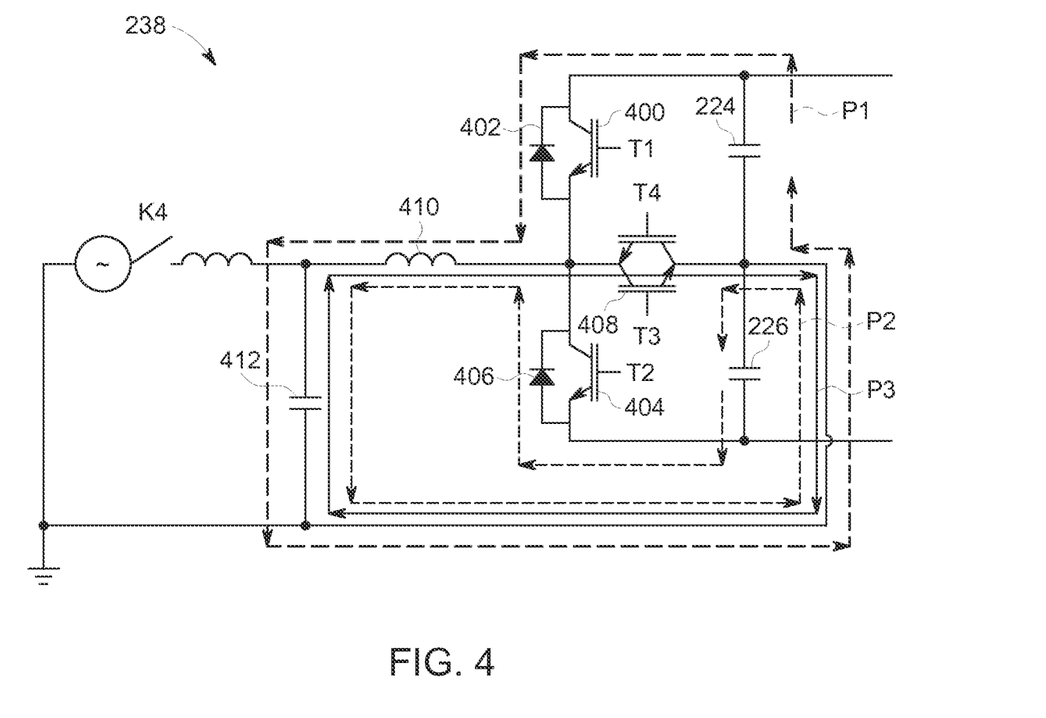
FIG. 4 is an exemplary circuit diagram showing operation of the first rectifier leg shown in FIG. 2 when a component failure affects the fourth leg shown in FIG. 2 and utility power is not present.

FIG. 4 is an exemplary circuit diagram showing operation of first leg 238 (shown in FIG. 2) of rectifier 212 (shown in FIG. 2) when a component failure affects fourth leg 214 (shown in FIG. 2) and utility power is not present. If there is no utility power, rectifier 212 cannot pull DC current from the utility. When there is a power outage, or when the input voltage goes beyond a tolerance, switch (K4) 36 (shown in FIG. 1) of rectifier 212 is opened to isolate rectifier 212 from the utility side when the utility voltage is out of the tolerance range. By isolating rectifier 212 from the utility, the DC balancing function is assumed by one or more of rectifier legs 238, 240, and 242. Rectifier legs 238, 240, and 242 operate effectively as a voltage balancing circuit in the same way as fourth leg 214. Each of rectifier legs 238, 240, and 242 operates in substantially similar fashion, so only first rectifier leg 238 is described herein.

In an exemplary embodiment, first rectifier leg 238 includes an upper switch (T1) 400 and an associated antiparallel diode (D1) 402, a lower switch (T2) 404 and an associated antiparallel diode (D2) 406, a pair of antiparallel switches (T3+T4), upper capacitor 224 and lower capacitor 226 of split DC link 222 (shown in FIG. 2). First rectifier leg 238 is coupled to inductor (L2) 410 and input capacitor (Cin) 412 of input filter 210 (shown in FIG. 2).

Operation will now be described by an example considering a case where charge needs to be transferred from the upper to lower capacitor bank. When control logic closes, or switches ON, upper switch (T1) 400, upper capacitor 224 discharges and drives a current through a path P1. As a result, inductor (L2) 410 becomes charged. When upper switch (T1) 401 is opened, or switched OFF, current flows through a path P2. Current flows through antiparallel diode (D2) 406 and inductor (L2) 410, and lower capacitor 226 becomes charged. While upper switch (T1) 401 is OFF, energy is effectively being transferred from upper capacitor 224 to lower capacitor 226 to balance the voltage across DC link 222.

Input capacitor (Cin) 412 is positioned between upper and lower capacitors 224 and 226, and becomes charged during the energy transfer from upper capacitor 224 to lower capacitor 226. When input capacitor (Cin) 412 becomes fully charged, switch (T3) 408 is switched ON, effectively closing a path P3. Input capacitor (Cin) 412 then discharges, enabling another cycle to occur.

Figure 5:
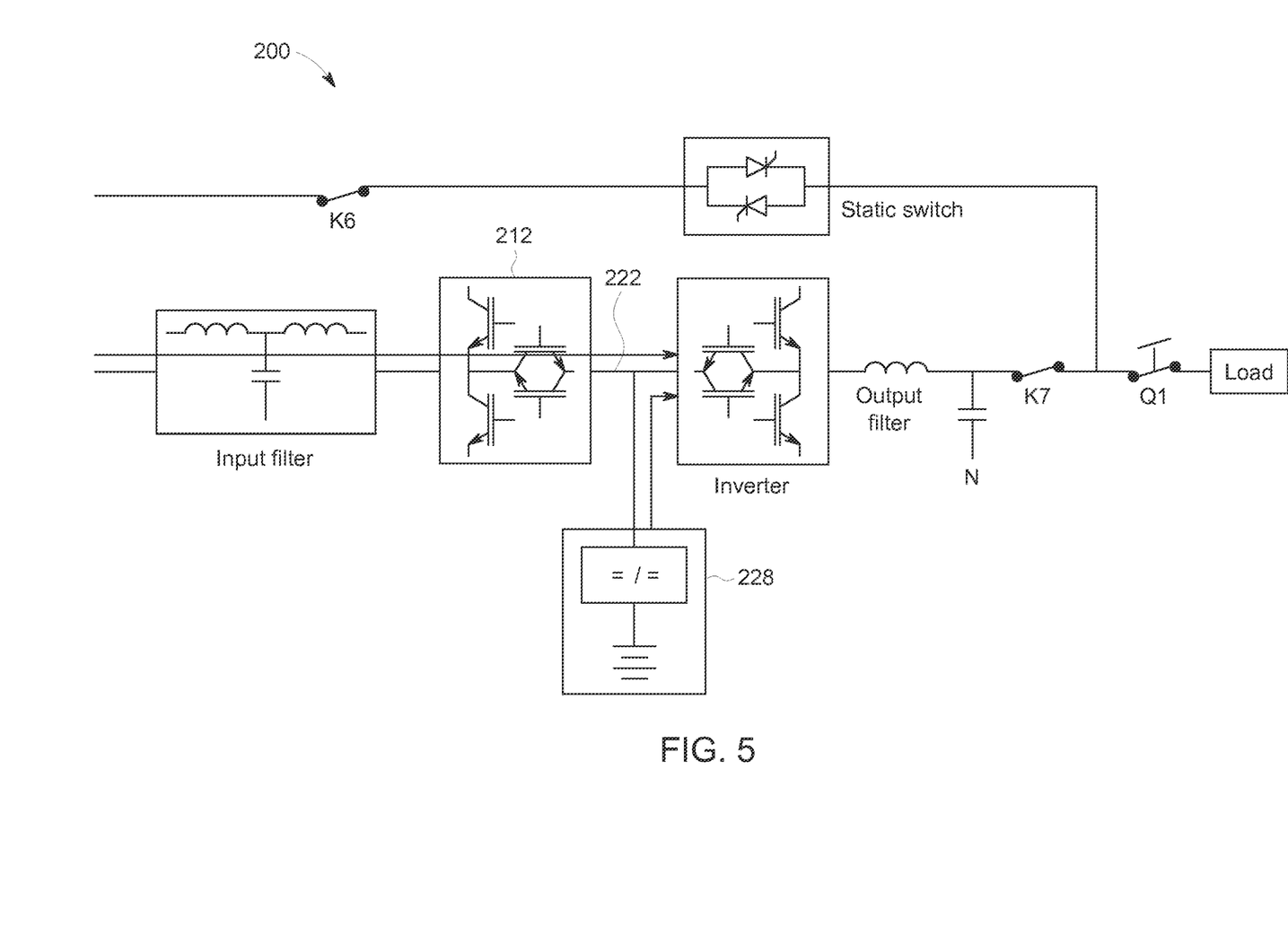
FIG. 5 is a block diagram showing operation of the UPS shown in FIG. 2 having an extended rectifier input voltage range.

FIG. 5 is a block diagram showing operation of an exemplary UPS 200 (shown in FIG. 2) having an extended rectifier input voltage range. In an exemplary embodiment, during a single-phase power outage and/or a component failure affecting a single rectifier leg 238, 240, or 242 (shown in FIG. 2), controller 220 (shown in FIG. 2) is configured to extend an input voltage tolerance range of rectifier 212 to enable rectifier 212 to operate at a lower input voltage. In fact, rectifier 212 can drive a higher current in low input voltage conditions.

For example, in one embodiment, rectifier 212 operates at a nominal voltage with a tolerance window of +/−15%. When voltage goes beyond the tolerance, rectifier 212 typically shuts off In an exemplary embodiment, the rectifier is a boost rectifier that boosts the input voltage to create a DC link voltage around 800V or 900V, splitting about 400V or 450V in each capacitor 224 and 226. Rectifier 212 regulates the DC link voltage while receiving low input voltages. Rectifier 212 operates even when the input voltage is less than −15% with respect to nominal voltage. Typical tolerances for rectifier operation are +/−10% or +/−15% with respect to nominal voltage. Rectifier 212 operates as constant power load, thereby drawing higher input current at lower voltage levels. If the voltage drops further below the 15% tolerance, rectifier 212 will hit its peak current limit at some point, and this is what determines the input voltage lower bound. In some embodiments, the input voltage may be extended so that rectifier 212 can tolerate a drop of 30-40% with respect to nominal.

In an exemplary embodiment, if rectifier 212 reaches its current limit or the power capability of rectifier 212 is insufficient, the missing energy is taken from energy storage device 228 (i.e., a battery). Energy storage device 228 is coupled in parallel to rectifier 212 and is configured to supplement rectifier 212 in providing energy when rectifier 212 reaches a predefined current limit. AC input utility and energy storage device 228 act as separate energy sources paralleled on DC link 222.

By maintaining rectifier 212 operational when input voltage is lower than the tolerance, UPS 200 is prevented from reverting to battery 228 operation. However, if UPS 200 does revert to battery 228 operation, any power that from the input voltage reduces the amount of power drawn from battery 228, resulting in extended battery autonomy.

Figure 6:
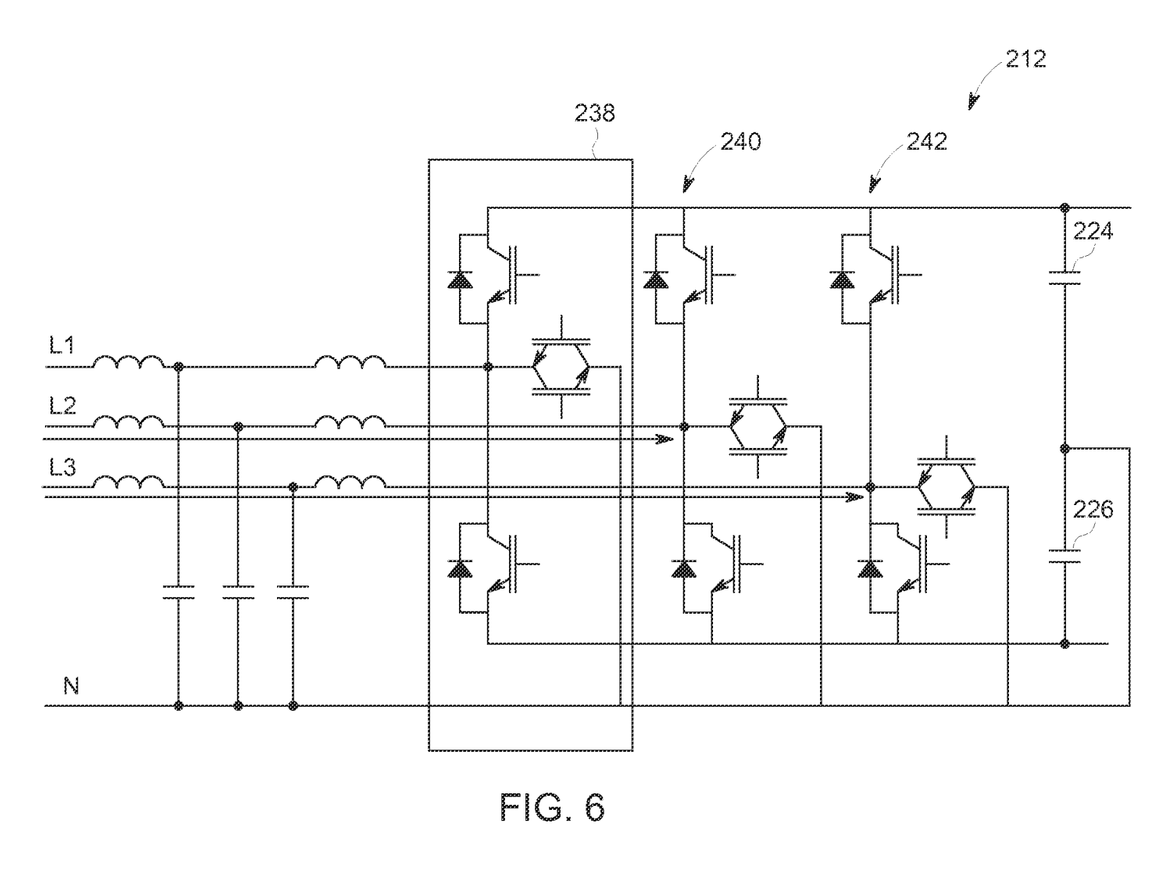
FIG. 6 is a circuit diagram of the rectifier shown in FIG. 2 in the event of a single-phase power outage and/or a component failure affecting a single rectifier leg.

FIG. 6 is a circuit diagram of rectifier 212 (shown in FIG. 2) in the event of a single-phase power outage and/or a component failure affecting a single rectifier leg. Because rectifier 212 has multiple legs 238, 240, 242, rectifier 212 can still be operational with a subset of legs 238, 240, 242 at a reduced power capability. Rectifier 212 can remain operational if one of legs 238, 240, or 242 fails or an event occurs on the input voltage that affects only one of the three phases.

For example, in an exemplary embodiment, during one of a single-phase power outage and a component failure affecting a single rectifier leg, for example, first rectifier leg 238, controller 220 (shown in FIG. 2) is configured to draw power from the remaining phases by operating second and third rectifier legs 240 and 242 as single-phase rectifiers in a four-wire distribution configuration.

In an alternative embodiment, during one of a single-phase power outage and a component failure affecting a single rectifier leg, for example, first rectifier leg 238, controller 220 (shown in FIG. 2) is configured to draw power from the remaining phases by operating second and third rectifier legs 240 and 242 as a line-to-line rectifier in a three-wire distribution configuration.

In an exemplary embodiment, if rectifier 212 reaches its current limit or the power capability of rectifier 212 is insufficient, the missing energy is taken from energy storage device 228 (i.e., a battery). Energy storage device 228 is coupled in parallel to rectifier 212 and is configured to supplement rectifier 212 in providing energy when rectifier 212 reaches a predefined current limit. AC input utility and energy storage device 228 act as separate energy sources paralleled on DC link 222.

In an example embodiment, given the flexibility to operate rectifier 212 as three separate single-phase converters, this same principle could be used to improve efficiency by implementing adaptive capacity control. If the power requirement does not require all of the rectifier legs to be switched ON, any unnecessary rectifier legs 238, 240, and/or 242 are switched OFF to reduce losses and increase operational efficiency of rectifier 212.

A technical effect of the systems and methods described herein includes at least one of: (a) providing a split direct current (DC) link including a first capacitor coupled between a positive DC link terminal and a first node, and a second capacitor coupled between the first node and a negative DC link terminal; (b) converting an AC voltage received from an AC source into a DC voltage to be provided to the split DC link, the AC voltage converted using at least one of a first leg, a second leg, and a third leg of a rectifier coupled to an input of the split DC link; (c) balancing the DC link voltages of the first and second capacitors using a fourth leg of the rectifier; and (d) maintaining, by a controller coupled to the rectifier, functionality of the rectifier during at least one of a partial utility power outage, a full utility power outage, and a failure of at least one of the first, second, third, and fourth legs.

As compared to at least some known UPS's, the systems and methods described herein enable a four-leg rectifier to remain operational during a partial utility outage (not affecting all phases) or under failure of one converter leg. The systems and methods also enable extending the voltage tolerances for the rectifier operation. Further, the systems and methods also enable the implementation of adaptive capacity control schemes to increase the rectifier efficiency in low-load conditions. The disclosed embodiments reduce stress on the rectifier and on the energy storage.

Exemplary embodiments of systems and methods for uninterruptible power supplies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An uninterruptible power supply (UPS), comprising:
   a split direct current (DC) link comprising a first capacitor coupled between a positive DC link terminal and a first node, and a second capacitor coupled between the first node and a negative DC link terminal;
   a rectifier coupled to an input of said split DC link, said rectifier comprising:
      a first leg, a second leg, and a third leg, wherein each leg of said first, second, and third legs comprises first and second series-coupled switches paired with corresponding antiparallel diodes, and wherein each leg of said first, second, and third legs is configured to convert an input alternating current (AC) voltage received from an AC source into a DC voltage to be provided to said split DC link through a pair of antiparallel switches electrically coupling a center tap arranged between the first and second series-coupled switches of the respective leg to the input of the split DC link; and
      a fourth leg configured to balance DC link voltages of said first and second capacitors; and
   a controller coupled to said rectifier and configured to adjust at least one operating parameter of said rectifier to operate said rectifier to perform voltage balancing during a failure of said fourth leg, while utility power is present and while utility power is not present.

2. A UPS in accordance with claim 1, wherein while utility power is present, said controller is configured to transfer the DC link voltage balancing from said fourth leg to said first, second, and third legs.

3. A UPS in accordance with claim 2, said controller is further configured to control said rectifier to draw a DC component from the AC source to compensate any voltage unbalance in said DC link.

4. A UPS in accordance with claim 1, wherein while utility power is not present, said controller is configured to operate said rectifier as a voltage balancing circuit.

5. A UPS in accordance with claim 4, wherein to operate said rectifier as a voltage balancing circuit, said controller is further configured to open a switch to isolate said rectifier from the AC source.

6. A UPS in accordance with claim 4, wherein said controller is further configured to operate one of said first, second, and third legs as the voltage balancing circuit.

7. A UPS in accordance with claim 1, wherein during one of a single-phase power outage and a component failure affecting a single rectifier leg, said controller is further configured to extend an input voltage tolerance range of said rectifier to enable said rectifier to operate at a lower input voltage.

8. A UPS in accordance with claim 7, wherein said UPS further comprises an energy storage device coupled in parallel to said rectifier, said energy storage device configured to supplement said rectifier in providing energy when said rectifier reaches a predefined current limit.

9. A UPS in accordance with claim 8, wherein said energy storage device comprises a battery.

10. A UPS in accordance with claim 1, wherein during one of a single-phase power outage and a component failure affecting a single rectifier leg of said first, second, and third rectifier legs, said controller is further configured to draw power from the remaining phases by operating the remaining rectifier legs of said first, second, and third rectifier legs as single-phase rectifiers in a four-wire distribution configuration.

11. A UPS in accordance with claim 10, wherein said UPS further comprises an energy storage device coupled in parallel to said rectifier, said energy storage device configured to supplement said rectifier in providing energy when said rectifier reaches a predefined current limit.

12. A UPS in accordance with claim 1, wherein during one of a single-phase power outage and a component failure affecting a single rectifier leg, said controller is further configured to draw power from the remaining phases by operating the remaining rectifier legs as single-phase rectifiers in a three-wire distribution configuration.

13. A UPS in accordance with claim 12, wherein said UPS further comprises an energy storage device coupled in parallel to said rectifier, said energy storage device configured to supplement said rectifier in providing energy when said rectifier reaches a predefined current limit.

14. A UPS in accordance with claim 1, further comprising an inverter coupled to an output of said split DC link, said inverter configured to convert the DC voltage into an output AC voltage.

15. A method of operating an uninterruptible power supply (UPS), said method comprising:
converting an alternating current (AC) voltage received from an AC source into a direct current (DC) voltage to be provided to a split DC link, the AC voltage converted using at least one of a first leg, a second leg, and a third leg of a rectifier coupled to an input of the split DC link;
balancing voltages of first and second capacitors of the split DC link using a fourth leg of the rectifier, wherein the first capacitor is coupled between a positive DC link terminal and a first node, and wherein the second capacitor is coupled between the first node and a negative DC link terminal;
adjusting, by a controller coupled to the rectifier, at least one operating parameter of the rectifier to perform voltage balancing, with the rectifier, during a failure of the fourth leg, while utility power is present and while utility power is not present;
accepting as inputs, by the controller, voltage measurements for the first and second capacitors;
calculating a difference between the voltage measurements;
summing the voltage measurements of the first and second capacitors to determine a DC link voltage;
comparing the DC link voltage to a reference voltage;
generating a rectifier current reference signal; and
adjusting, by the controller coupled to the rectifier, the at least one operating parameter of the rectifier to perform voltage balancing with two of the legs of the rectifier during a single phase power outage based on the DC link voltage, the reference voltage, the measured voltage difference, and the rectifier current reference signal.

16. A method in accordance with claim 15, wherein while utility power is present, said method further comprises:
transferring the DC link voltage balancing from said fourth leg to said first, second, and third legs, and
controlling the rectifier to draw a DC component from the AC source to compensate any voltage unbalance in said DC link.

17. A method in accordance with claim 15, wherein while utility power is not present, said method further comprises operating the rectifier as a voltage balancing circuit by using the controller to open a switch to isolate the rectifier from the AC source.

18. A method in accordance with claim 15, wherein during one of a single-phase power outage and a component failure affecting a single rectifier leg, said method further comprises extending an input voltage tolerance range of the rectifier to enable the rectifier to operate at a lower input voltage.

19. A method in accordance with claim 15, wherein during one of a single-phase power outage and a component failure affecting a single rectifier leg of the first, second, and third rectifier legs, said method further comprises drawing power from the remaining phases by operating the remaining rectifier legs of the first, second, and third rectifier legs as single-phase rectifiers in a four-wire distribution configuration.

20. A method in accordance with claim 15, wherein during one of a single-phase power outage and a component failure affecting a single rectifier leg, said method further comprises drawing power from the remaining phases by operating the remaining rectifier legs as a line-to-line rectifier in a three-wire distribution configuration.

* * * * *